US011072443B1

(12) United States Patent
Bollfrass

(10) Patent No.: US 11,072,443 B1
(45) Date of Patent: Jul. 27, 2021

(54) SYSTEMS AND METHODS FOR SIMULATION OF EXTRAVEHICULAR ACTIVITY IN SPACE

(71) Applicant: OPIFEX GLOBAL, Austin, TX (US)

(72) Inventor: Charles Barton Bollfrass, Austin, TX (US)

(73) Assignee: Opifex Global, LLC, Austin, TX (US)

( * ) Notice: Subject to any disclaimer, the term of this patent is extended or adjusted under 35 U.S.C. 154(b) by 322 days.

(21) Appl. No.: 16/256,062

(22) Filed: Jan. 24, 2019

(51) Int. Cl.
*B64G 7/00* (2006.01)
*G09B 9/52* (2006.01)
*B64G 6/00* (2006.01)
*H04N 9/31* (2006.01)

(52) U.S. Cl.
CPC .......... *B64G 7/00* (2013.01); *B64G 6/00* (2013.01); *G09B 9/52* (2013.01); *H04N 9/3185* (2013.01)

(58) Field of Classification Search
None
See application file for complete search history.

(56) References Cited

U.S. PATENT DOCUMENTS

| | | | | |
|---|---|---|---|---|
| 4,678,438 A | * | 7/1987 | Vykukal | G09B 9/00 434/34 |
| RE45,525 E | * | 5/2015 | Xiao | A63F 13/20 434/4 |

\* cited by examiner

*Primary Examiner* — Lisa M Caputo
*Assistant Examiner* — Nigel H Plumb
(74) *Attorney, Agent, or Firm* — Jackson Walker L.L.P.

(57) ABSTRACT

A system may include a pool of liquid and a control system associated with the pool of liquid and configured to, in concert with the pool of liquid, control one of more components of the system to simulate to a human in the pool of liquid performance of extravehicular activity in space.

26 Claims, 3 Drawing Sheets

SYSTEMS AND METHODS FOR SIMULATION OF EXTRAVEHICULAR ACTIVITY IN SPACE

TECHNICAL FIELD

The present disclosure relates in general to simulation of real conditions associated with extravehicular activity by humans in space (sometimes referred to as a "spacewalk"), and more particularly to providing systems and methods for simulating real conditions associated with extravehicular activity by humans in space.

BACKGROUND

In the field of astronomy, the term "extravehicular activity" or "EVA" broadly refers to any activity performed by an astronaut or cosmonaut outside of a spacecraft beyond the Earth's appreciable atmosphere (e.g., outside of the Karman line). While the term can be applied to lunar surface exploration (i.e., "moonwalks"), extravehicular activity most commonly refers to a spacewalk made outside of a craft orbiting Earth (e.g., the International Space Station or other orbital space station, a vehicle for carrying humans between Earth and space, etc.). Safe and successful completion of extravehicular activity often requires extensive training and preparation, but effective training is rendered challenging by the infeasibility of conducting such training and preparation in space coupled with the differences in conditions between space and the surface of the Earth, most notably that in real extravehicular activities, constant freefall of humans and other objects causes a perception of weightlessness not present on or near the surface of the Earth. Accordingly, systems and methods for Earth-based simulation of extravehicular activity in space are desired.

SUMMARY

In accordance with the teachings of the present disclosure, the disadvantages and problems associated with current approaches to simulation of extravehicular activity in space may be reduced or eliminated.

In accordance with embodiments of the present disclosure, a system may include a pool of liquid and a control system associated with the pool of liquid and configured to, in concert with the pool of liquid, control one or more components of the system to simulate to a human in the pool of liquid performance of extravehicular activity in space.

In accordance with these and other embodiments of the present disclosure, a method may comprise controlling one or more components of a system comprising a pool of liquid such that the one or more components, in concert with the pool of liquid, simulate to a human in the pool of liquid performance of extravehicular activity in space.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
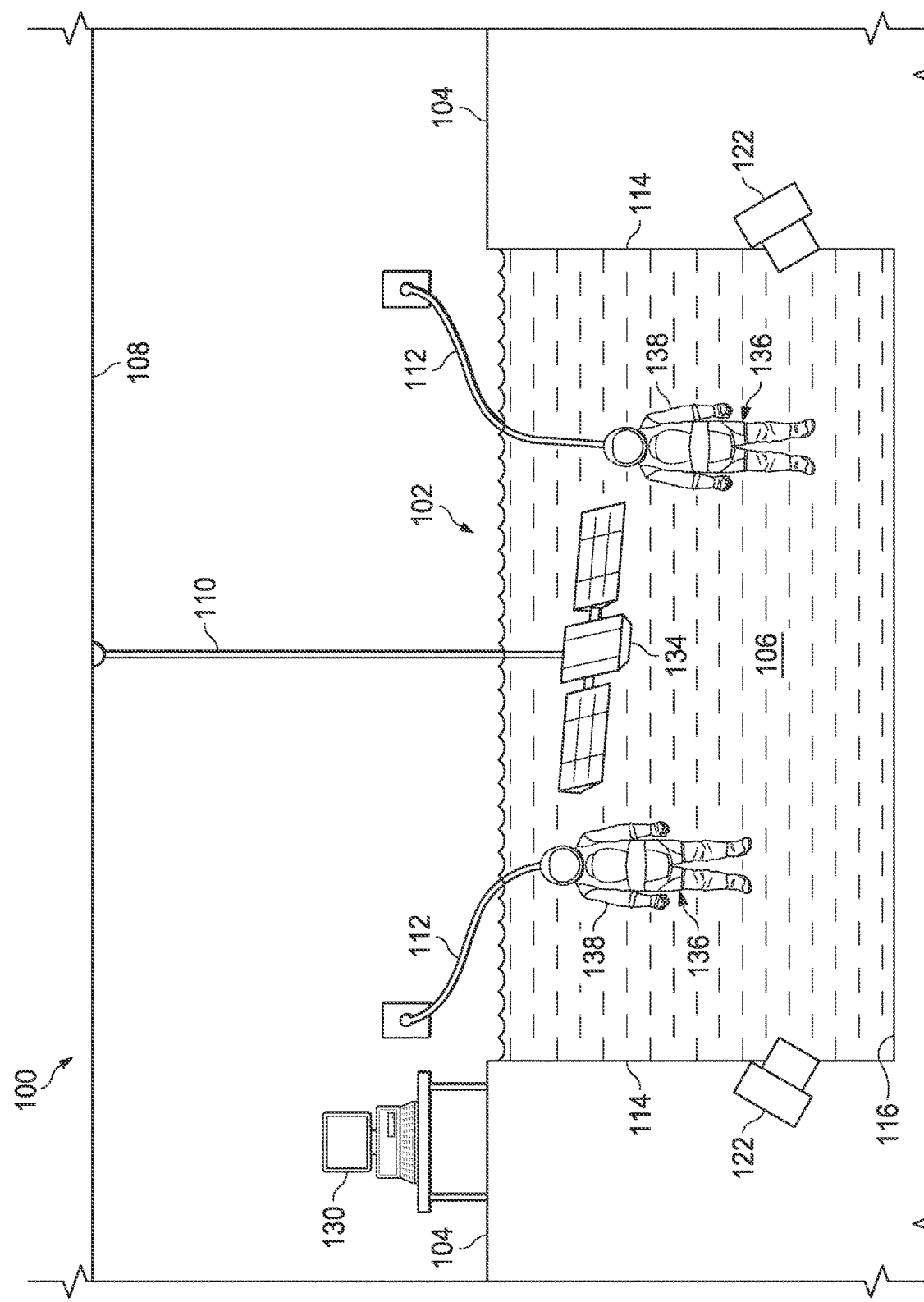
FIG. 1 illustrates a side elevation view of selected components of a system for simulation of extravehicular activity in space, in accordance with embodiments of the present disclosure.
Figure 2:
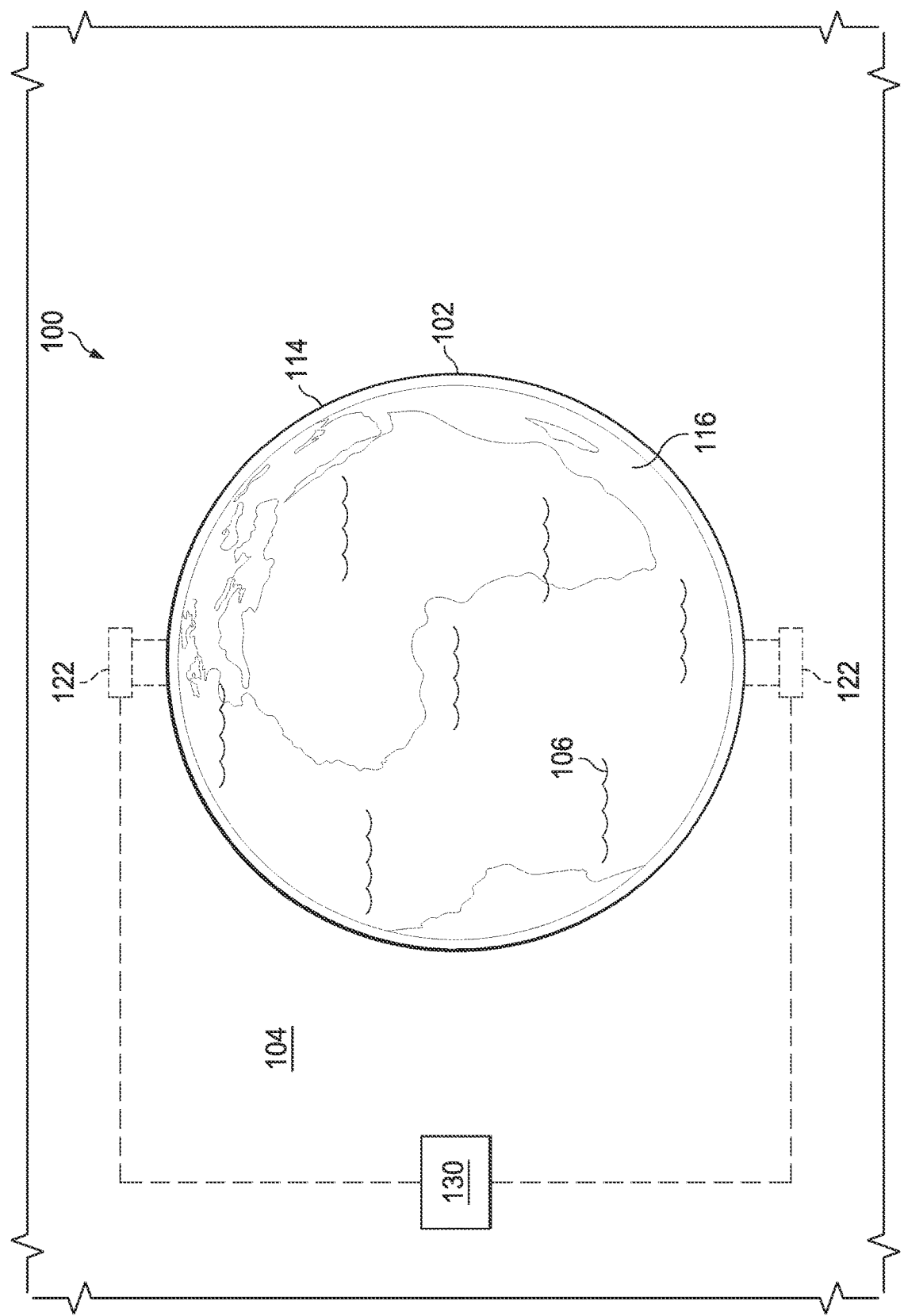
FIG. 2 illustrates a top-down plan view of selected components of the system for simulation of extravehicular activity in space depicted in FIG. 1, in accordance with embodiments of the present disclosure.
Figure 3:
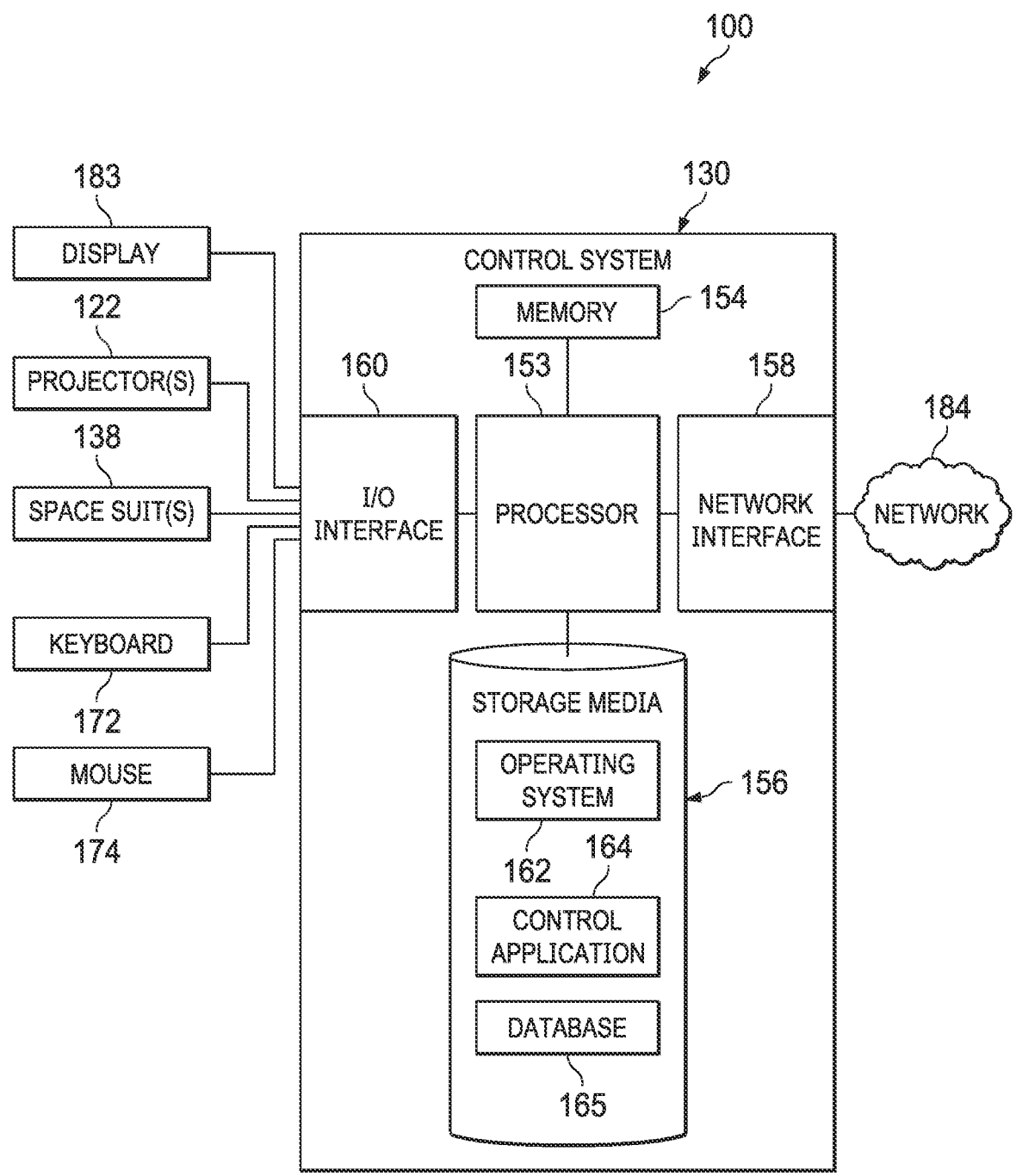
FIG. 3 illustrates a block diagram of selected components of the system for simulation of extravehicular activity in space depicted in FIGS. 1 and 2, in accordance with embodiments of the present disclosure.

Preferred embodiments and their advantages are best understood by reference to FIGS. 1 through 3, wherein like numbers are used to indicate like and corresponding parts.

For the purposes of this disclosure, a computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a computing system may comprise a personal computer, a personal digital assistant (PDA), a consumer electronic device (e.g., a cable/satellite set-top box, a gaming console or other dedicated-function console, etc.), a network storage device, or any other suitable device and may vary in size, shape, performance, functionality, and price. The computing system may include memory, one or more processing resources such as a central processing unit ("CPU"), a graphics processing unit ("GPU"), hardware control logic, or software control logic. Additional components of the computing system may include one or more storage devices, one or more communications ports for communicating with external devices as well as various input/output ("I/O") devices, such as a keyboard, a mouse, video display (e.g., head-mounted device or other video display), joystick, game controller, etc. The computing system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 illustrates a side elevation view of selected components of a system 100 for simulation for extravehicular activity in space, in accordance with embodiments of the present disclosure. FIG. 2 illustrates a top-down plan view of selected components of system 100, in accordance with embodiments of the present disclosure. FIG. 3 illustrates a block diagram of selected components of system 100, in accordance with embodiments of the present disclosure. As shown in the FIGURES, system 100 may include a pool 102 of water 106, a deck 104, a ceiling 108, a suspension assembly 110, one or more image projectors 122, and a service object 134. In operation, as described in greater detail below, system 100 may be used to simulate real-world conditions associated with extravehicular activity in space by one or more humans 136.

Pool 102 may include any tank, vessel, and/or container for containing water 106, and may be implemented as an in-ground structure or an above-ground structure. Accordingly, pool 102 may be constructed from any suitable material, including plastic, concrete, steel, or other materials. As shown in FIGS. 1 and 2, pool 102 may include one or more generally vertical wall(s) 114 and a generally horizontal floor 116 for containing water 106. To simulate the visual effect of being in space, wall(s) 114 may be painted or otherwise colored black or a suitably dark color, while one or more images of Earth may be projected onto floor 116 to simulate orbit around Earth. While pool 102 is depicted in FIGS. 1 and 2 as being in the shape of a cylinder, pool 102 may be constructed in any suitable shape. In addition, although not shown in the FIGURES for the purposes of clarity and exposition, pool 102 may be fluidically coupled to fluidic conduits, drains, pipes, pumps, or any other fluid conveying system or device in order to fill pool 102 and drain water from pool 102.

Deck 104 may be formed proximate to pool 102 and may include any suitable surface upon which individuals may walk before, during, or after simulations using system 100 and/or for maintenance of system 100.

An image projector 122 may include any suitable system, device, or apparatus configured to provide any suitable lighting effect desired for simulated extravehicular activity. For example, in some embodiments, image projector(s) 122 may be configured to project an image onto floor 116 to simulate a particular view that may be present during actual extravehicular activity in space, such as an image of the Earth as seen from space. In such embodiments, images projected by image projector(s) 122 onto floor 116 may be moving images in order to simulate natural rotation of the Earth and/or simulated movement of humans 136 and service object 134 relative to the Earth. In addition or alternatively in such embodiments, images projected by image projector(s) 122 onto floor 116 may simulate the visual effects from the perspective of space of daytime and nighttime upon Earth.

Service object 134 may include any object that may be placed in pool 102 to simulate presence of an in-orbit object during extravehicular activity. For example, service object 134 may be a replica of or otherwise simulate the presence of an artificial satellite, telescope, space station, or other space-borne object. In some embodiments, a service object 134 may be suspended by a suspension assembly from ceiling 108. In other embodiments, although not explicitly shown in the FIGURES, service object 134 may be coupled to an electro-mechanical arm and/or other electro-mechanical device communicatively coupled to control system 130, so that control system 130 may control a location of such service object 134 within pool 102.

As described above and shown in FIG. 1, one or more humans 136 may enter pool 102 in order to interact with service object 134 in order to simulate their interaction, during extravehicular activity, with a space-borne object simulated by service object 134. As shown in FIG. 1, a human 136 may wear a spacesuit 138 configured to simulate the presence or feeling of an actual space suit being worn while performing extravehicular activity in space. Thus, spacesuit 138 may comprise an actual spacesuit adapted for use in system 100 or may comprise a replica spacesuit constructed specifically for use in system 100 and mimicking the features of an actual spacesuit.

As shown in FIG. 1, a spacesuit 138 may be mechanically, electrically, and/or fluidically coupled to a respective umbilical 112. An umbilical 112 may comprise a system, device, or apparatus figured to electrically conduct (e.g., via electrically-conductive wires surrounded by electrically-insulated materials to insulate from water 106) electrical energy to and/or electronic signals to and/or from spacesuit 138. Additionally or alternatively, an umbilical 112 may comprise a system, device, or apparatus figured to cause air to flow to or from the interior of spacesuit 138, for example to provide a human 136 with oxygen for respiration, cause exhaled carbon dioxide to flow out of spacesuit 138, and/or to control buoyancy of a human 136 in a spacesuit 138 relative to water 106. In some embodiments, spacesuit 138 may include a tank of air for assisting in respiration in lieu of air being communicated via umbilical 112.

As mentioned above, umbilical 112 may control flow of air to and from spacesuit 138 in order to control a buoyancy of a human 136 within a spacesuit 138 relative to water 106. Thus, under control of control system 130, a buoyancy of a human 136 within a spacesuit 138 relative to water 106 may be controlled in order that the human 136 within the spacesuit 138 maintains a neutral buoyancy with respect to water 106, thus simulating continuous freefall or "weightlessness" to the perception of human 136.

Although not shown in the FIGURES for the purposes of clarity and exposition, umbilical 112 may be fluidically coupled to fluidic conduits, pumps, or any other fluid conveying system or device in order to cause flow of gases to and from spacesuit 138.

In some embodiments, electronic signals carried by umbilical 112 may comprise electronic telemetry data regarding vital statistics of human 136 within spacesuit 138, such as heart rate, body temperature, and/or other vital statistics. In these and other embodiments, electronic signals carried by umbilical 112 may comprise audio data carrying speech or other sound (thus simulating radio communication to/from human 136 while performing extravehicular activity).

In these and other embodiments, electronic signals carried by umbilical 112 may comprise visual data. In such embodiments, such visual data may comprise augmented reality images wherein spacesuit 138 is equipped with a display capable of overlaying such augmented reality images onto service object 134 and/or another component of system 100, to further simulate the presence of objects represented by images. As examples, such augmented reality images may comprise simulated components of service object 134 (e.g., mechanical or electrical components of service object 134, mechanical tools for servicing service object 134, or any other suitable object).

In some embodiments, spacesuit 138 may communicate some or all relevant electronic signals via wireless transmissions (e.g., Wireless Fidelity, Bluetooth, etc.) in lieu of a wired coupling via umbilical 112.

Control system 130 may include any system, device, or apparatus (or any suitable aggregation of systems, devices, and/or apparatuses) configured to communicatively couple to the various components of system 100 in order to achieve a desired simulation environment. A non-limiting list of simulation parameters that may be controlled by control system 130 may include:

the buoyancy of a human 136 within a spacesuit 138 relative to water 106;

images projected by projector(s) 122 onto floor 116 to simulate the visual perception of the Earth;

augmented reality data displayed to a human 136 within a spacesuit 138;

a position of service object 134 within pool 102; and a flow of breathable air to a human 136 within a spacesuit 138.

In addition, control system 130 may sense or otherwise receive data from other components of system 100, such as electronic signals from a spacesuit 138 regarding vital statistics of a human 136 within such spacesuit 138.

As shown in FIG. 3, control system 130 may be implemented as a computing system. In some embodiments, control system 130 may be a personal computer. In other embodiments, control system 130 may be a portable computing device (e.g., a laptop, notebook, tablet, handheld, smart phone, personal digital assistant, etc.). In some embodiments, control system 130 may include a single device (e.g., computing device) providing centralized control of components of system 100. In these and other embodiments, some portions of control system 130 may be embodied in dedicated or embedded controllers associated with particular components such that control system 130 includes some aggregation of individual, dedicated controllers. As depicted in FIG. 3, control system 130 may include a processor 153, a memory 154 communicatively coupled to processor 153, storage media 156 communicatively coupled to processor 153, a network interface 158 communicatively coupled to processor 153, and an I/O interface 160 communicatively coupled to processor 153.

Processor 153 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 153 may interpret and/or execute program instructions and/or process data stored in memory 154, storage media 156, and/or another component of control system 130.

Memory 154 may be communicatively coupled to processor 153 and may include any system, device, or apparatus configured to retain program instructions and/or data for a period of time (e.g., computer-readable media). Memory 154 may include RAM, EEPROM, a PCMCIA card, flash memory, magnetic storage, opto-magnetic storage, or any suitable selection and/or array of volatile or non-volatile memory that retains data after power to control system 130 is turned off.

Storage media 156 may be communicatively coupled to processor 153. Storage media 156 may include any system, device, or apparatus operable to store information processed by processor 153. Storage media 156 may include, for example, network attached storage, one or more direct access storage devices (e.g., hard disk drives), and/or one or more sequential access storage devices (e.g., tape drives). As shown in FIG. 3, storage media 156 may have stored thereon an operating system (OS) 162. OS 162 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 162. In some embodiments, OS 162 may be a general-purpose OS such as WINDOWS or LINUX, for example. In other embodiments, OS 162 may comprise a specific- and/or limited-purpose OS, configured so as to perform application-specific functionality such as the control of components of system 100. Active portions of OS 162 may be transferred from storage media 156 to memory 154 for execution by processor 153.

As also shown in FIG. 3, storage media 156 may have stored thereon a control application 164. Control application 164 may be any program of executable instructions, or aggregation of programs of executable instructions, configured to interact with OS 162 to facilitate the control of components of system 100 as described above and/or display of control parameters for the various components on display 183. Active portions of control application 164 may be transferred from storage media 156 to memory 154 for execution by processor 153.

As also shown in FIG. 3, storage media 156 may have stored thereon a database 165. Database 165 may include any suitable data structure or data structures which store any information of data associated with system 100.

Network interface 158 may comprise any suitable system, apparatus, or device operable to serve as an interface between control system 130 and one or more other computing systems. Network interface 158 may enable control system 130 to communicate using any suitable transmission protocol and/or standard, including without limitation those protocols and/or standards set forth below with respect to network 184. In these and other embodiments, network interface 158 may comprise a network interface card, or "NIC."

I/O interface 160 may comprise any suitable system, apparatus, or device operable to serve as an interface between control system 130 and one or more input/output devices. For example, I/O interface 160 may permit a user to input data and/or instructions into control system 130, and/or otherwise manipulate control system 130 and its associated components (e.g., via keyboard 172, mouse 174, or via touchscreen input device on display 183). I/O interface 160 may also permit control system 130 to communicate data and/or content to a user, e.g., by way of display 183, and/or another display device.

Keyboard 172 may be communicatively coupled to I/O interface 160, and may include any typewriter-style device, which uses an arrangement of buttons and/or keys which may be manipulated by fingers of a user, to act as mechanical levers and/or electronic switches to input data to control system 130.

Mouse 174 may be communicatively coupled to I/O interface 160, and may include any suitable system, apparatus, or device configured to detect two-dimensional motion relative to a surface, wherein such motion is typically translated into the motion of a pointer on a display, allowing for fine control of a graphical user interface.

Display 183 may comprise any suitable system, device, or apparatus configured to display human-perceptible graphical data and/or alphanumeric data to a user. For example, in some embodiments, display 183 may comprise a liquid crystal display, light-emitting diode display, or other type of display.

As shown in FIG. 3, various other components of system 100 may be communicatively coupled to control system 130 via I/O interface 160, thus allowing communication between such components and components of control system 130. Although for purposes of descriptive clarity, many components of system 100 are shown coupled to control system 130 via I/O interface 160, in some embodiments, such components may be coupled to control system 130 via network 184 or a dedicated communication channel between processor 153 and a particular component.

In addition to processor 153, memory 154, storage media 156, network interface 158, and I/O interface 160, control system 130 may include one or more other computing system resources.

Network 184 may be a network and/or fabric configured to communicatively couple computing systems to one another. In these and other embodiments, network 184 may include a communication infrastructure, which provides physical connections, and a management layer, which organizes the physical connections and computing systems communicatively coupled to network 184. Network 184 may be implemented as, or may be a part of, a personal area network (PAN), a local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 184 may transmit data via wireless transmissions and/or wire-line transmissions using any storage and/or communication protocol, including without limitation, Internet protocol (IP), File Transfer Protocol (FTP), HyperText Transmission Protocol, Dynamic Host Configuration Protocol (DHCP), other packet-based protocol, and/or any combination thereof. Network 184 and its various components may be implemented using hardware, software, or any combination thereof.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a pool of liquid;
    a control system associated with the pool of liquid and configured to, in concert with the pool of liquid:
        control one of more components of the system to simulate to a human in the pool of liquid performance of extravehicular activity in space; and
        control the one or more image projectors to simulate Earth as seen from space; and
    one or more image projectors communicatively coupled to the control system;
    wherein the control system is further configured to:
    control the one or more image projectors to project images onto a floor of the pool to simulate a view present during actual extravehicular activity in space;
    cause the one or more image projectors to simulate the visual effects from the perspective of space of daytime and nighttime upon Earth.

2. The system of claim 1, wherein the control system is configured to regulate a buoyancy of the human relative to the liquid in the pool in order to render the human neutrally buoyant with respect to the liquid in order to simulate constant freefall in space.

3. The system of claim 2, wherein the control system is configured to regulate the buoyancy by controlling a flow of gas to or from a spacesuit which the human is wearing.

4. The system of claim 1, wherein the control system is configured to cause the one or more image projectors to project moving images in order to simulate at least one of natural rotation of the Earth and simulated movement of the human relative to the Earth.

5. The system of claim 1, wherein the control system is further configured to communicate visual data to a spacesuit worn by the human in order to display augmented reality images to the human to further simulate extravehicular activity in space.

6. A system comprising:
    a pool of liquid;

a control system associated with the pool of liquid and configured to, in concert with the pool of liquid, control one of more components of the system to simulate to a human in the pool of liquid performance of extravehicular activity in space; and a service object within the pool of liquid configured to simulate presence of a space-borne object present during extravehicular activity;

wherein:

the service object is mechanically coupled to an electromechanical device communicatively coupled to the control system; and the control system is configured to control the electromechanical device to position the service object in the pool.

7. The system of claim 6, wherein the control system is configured to regulate a buoyancy of the human relative to the liquid in the pool in order to render the human neutrally buoyant with respect to the liquid in order to simulate constant freefall in space.

8. The system of claim 7, wherein the control system is configured to regulate the buoyancy by controlling a flow of gas to or from a spacesuit which the human is wearing.

9. The system of claim 6, further comprising one or more image projectors communicatively coupled to the control system, and wherein the control system is configured to control the one or more image projectors to project images onto a floor of the pool to simulate a view present during actual extravehicular activity in space.

10. The system of claim 9, wherein the control system is configured to control the one or more image projectors to simulate Earth as seen from space.

11. The system of claim 10, wherein the control system is configured to cause the one or more image projectors to project moving images in order to simulate at least one of natural rotation of the Earth and simulated movement of the human relative to the Earth.

12. The system of claim 10, wherein the control system is configured to cause the one or more image projectors to simulate the visual effects from the perspective of space of daytime and nighttime upon Earth.

13. The system of claim 6, wherein the control system is further configured to communicate visual data to a spacesuit worn by the human in order to display augmented reality images to the human to further simulate extravehicular activity in space.

14. A method further comprising:

controlling one or more components of a system comprising a pool of liquid such that the one or more components, in concert with the pool of liquid, simulate to a human in the pool of liquid performance of extravehicular activity in space;

controlling one or more image projectors to project images onto a floor of the pool to simulate a view present during actual extravehicular activity in space;

controlling the one or more image projectors to simulate Earth as seen from space; and projecting images to simulate the visual effects from the perspective of space of daytime and nighttime upon Earth.

15. The method of claim 14, further comprising regulating a buoyancy of the human relative to the liquid in the pool in order to render the human neutrally buoyant with respect to the liquid in order to simulate constant freefall in space.

16. The method of claim 15, further comprising regulating the buoyancy by controlling a flow of gas to or from a spacesuit which the human is wearing.

17. The method of claim 14, further comprising projecting moving images in order to simulate at least one of natural rotation of the Earth and simulated movement of the human relative to the Earth.

18. The method of claim 14, further comprising communicating visual data to a spacesuit worn by the human in order to display augmented reality images to the human to further simulate extravehicular activity in space.

19. A method comprising:

controlling one or more components of a system comprising a pool of liquid such that the one or more components, in concert with the pool of liquid, simulate to a human in the pool of liquid performance of extravehicular activity in space; and further comprising controlling a position of the service object in the pool.

20. The method of claim 19, further comprising regulating a buoyancy of the human relative to the liquid in the pool in order to render the human neutrally buoyant with respect to the liquid in order to simulate constant freefall in space.

21. The method of claim 20, further comprising regulating the buoyancy by controlling a flow of gas to or from a spacesuit which the human is wearing.

22. The method of claim 19, further comprising controlling one or more image projectors to project images onto a floor of the pool to simulate a view present during actual extravehicular activity in space.

23. The method of claim 22, further comprising controlling the one or more image projectors to simulate Earth as seen from space.

24. The method of claim 23, further comprising projecting moving images in order to simulate at least one of natural rotation of the Earth and simulated movement of the human relative to the Earth.

25. The method of claim 23, further comprising projecting images to simulate the visual effects from the perspective of space of daytime and nighttime upon Earth.

26. The method of claim 19, further comprising communicating visual data to a spacesuit worn by the human in order to display augmented reality images to the human to further simulate extravehicular activity in space.

* * * * *